US011549753B2

(12) United States Patent
Beesley et al.

(10) Patent No.: US 11,549,753 B2
(45) Date of Patent: Jan. 10, 2023

(54) LAMINAR FLOW SHRINK OVEN

(71) Applicant: ILLINOIS TOOL WORKS INC., Glenview, IL (US)

(72) Inventors: Robert C. Beesley, Greenville, SC (US); Mark Davidson, Greer, SC (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 246 days.

(21) Appl. No.: 15/876,826

(22) Filed: Jan. 22, 2018

(65) Prior Publication Data

US 2018/0209740 A1 Jul. 26, 2018

Related U.S. Application Data

(60) Provisional application No. 62/449,843, filed on Jan. 24, 2017.

(51) Int. Cl.
*B65B 53/06* (2006.01)
*F27D 7/06* (2006.01)
(Continued)

(52) U.S. Cl.
CPC ................ *F27D 7/06* (2013.01); *B65B 53/06* (2013.01); *B65B 53/063* (2013.01); *F27B 9/24* (2013.01); *F27D 7/02* (2013.01); *F27D 7/04* (2013.01); *B65D 71/08* (2013.01); *F27D 2007/026* (2013.01); *F27D 2007/045* (2013.01); *F27D 2007/063* (2013.01)

(58) Field of Classification Search
CPC ..... F27D 7/06; F27D 7/02; F27D 7/04; F27D 2007/026; F27D 2007/045; F27D 2007/063; B65B 53/06; B65B 53/063; F27B 9/24; B65D 71/08
USPC ........................................................... 53/442
See application file for complete search history.

(56) References Cited

U.S. PATENT DOCUMENTS 3,272,415 A * 9/1966 Wallin .................. B65G 51/03 242/615.11
3,324,570 A * 6/1967 Flaith .................... F26B 13/104 34/643
(Continued)

FOREIGN PATENT DOCUMENTS

CN 105667900 A 6/2016
DE 10 2012 103 402 A1 10/2013
(Continued)

OTHER PUBLICATIONS

European Patent Office, EPO Form 1503 03.82, European Search Report for European Patent Application No. EP 18 15 3097, dated May 7, 2018. (7 pages).

*Primary Examiner* — Sameh Tawfik
(74) *Attorney, Agent, or Firm* — Pauley Erickson & Swanson

(57) ABSTRACT

Heat shrink wrap product packaging oven or tunnel apparatus and processing methods are provided which incorporate or utilize airfoils in conjunction with hot air-providing side walls to desirably control impact of hot air onto a product wrapped with a tube of heat shrink wrap film and being conveyed on a conveyor thereby. In such heat shrink wrap product packaging apparatus and methods, such airfoils can be movable, e.g., rotatably moveable, relative to the side walls to vertically alter an air impact point onto the product.

18 Claims, 15 Drawing Sheets

(51) Int. Cl.

| | |
|---|---|
| ***F27B 9/24*** | (2006.01) |
| ***F27D 7/02*** | (2006.01) |
| ***F27D 7/04*** | (2006.01) |
| *B65D 71/08* | (2006.01) |

(56) References Cited

U.S. PATENT DOCUMENTS

| | | | | | |
|---|---|---|---|---|---|
| 3,399,506 | A * | 9/1968 | Howe, Jr. | B65B 53/063 | 53/442 |
| 3,711,957 | A | 1/1973 | Carver, Jr. | | |
| 3,717,939 | A * | 2/1973 | Mitchell | B65B 53/063 | 34/230 |
| 3,744,146 | A | 7/1973 | Nichols | | |
| 3,818,182 | A * | 6/1974 | Linde | A61G 7/08 | 219/388 |
| 3,964,656 | A * | 6/1976 | Hella | B65H 23/24 | 242/615.11 |
| 3,979,038 | A * | 9/1976 | Karlsson | B65H 23/24 | 242/615.11 |
| 3,984,039 | A * | 10/1976 | Hawley | G11B 15/60 | 242/615.12 |
| 4,172,873 | A * | 10/1979 | Spicer | B65B 53/06 | 156/86 |
| 4,198,560 | A * | 4/1980 | Dietrich | B65B 53/02 | 198/774.4 |
| 4,204,006 | A * | 5/1980 | Emgard | A23L 3/185 | 165/120 |
| 4,233,008 | A * | 11/1980 | Murray | B28B 11/245 | 425/77 |
| 4,271,601 | A * | 6/1981 | Koponen | D21F 5/187 | 226/196.1 |
| 4,597,247 | A * | 7/1986 | Johnson | B65B 53/063 | 34/225 |
| 4,738,082 | A * | 4/1988 | Saitoh | B65B 53/063 | 53/557 |
| 4,947,741 | A * | 8/1990 | Gongwer | A47J 37/044 | 99/345 |
| 5,062,217 | A * | 11/1991 | Tolson | B65B 53/063 | 34/216 |
| 5,193,290 | A * | 3/1993 | Tolson | B65B 53/02 | 34/216 |
| 5,400,570 | A * | 3/1995 | Bennett | B65B 53/04 | 34/216 |
| 5,899,048 | A * | 5/1999 | Havens | B65B 53/063 | 53/442 |
| 6,267,588 | B1 * | 7/2001 | Querol | F27B 9/10 | 432/121 |
| 6,502,735 | B1 * | 1/2003 | Krieger | B65H 23/24 | 226/196.1 |
| 6,648,634 | B2 * | 11/2003 | Nava | B65B 53/063 | 432/121 |
| 6,689,180 | B1 * | 2/2004 | Liao | B65B 53/063 | 34/211 |
| 7,155,876 | B2 | 1/2007 | Vandertuin et al. | | |
| 7,811,084 | B2 * | 10/2010 | Huang | B29C 61/00 | 432/121 |
| 8,783,337 | B2 * | 7/2014 | Hyde | F28F 13/06 | 165/287 |
| 2004/0123566 | A1 * | 7/2004 | Limousin | B65B 53/063 | 53/442 |
| 2004/0231301 | A1 * | 11/2004 | VanderTuin | B65B 53/063 | 53/557 |

FOREIGN PATENT DOCUMENTS

| | | | |
|---|---|---|---|
| EP | 2 319 769 | A1 | 5/2011 |
| EP | 2 653 394 | A1 | 10/2013 |

* cited by examiner

LAMINAR FLOW SHRINK OVEN

CROSS-REFERENCE TO RELATED APPLICATIONS

This application claims the benefit of and priority to U.S. Provisional Application, Ser. No. 62/449,843, filed 24 Jan. 2017. This U.S. Provisional Application is hereby incorporated by reference herein in its entirety and are made a part hereof, including but not limited to those portions which specifically appear hereinafter.

BACKGROUND OF THE INVENTION

Field of the Invention

This invention relates generally to product packaging and, more particularly, to product packaging using an oven to shrink wrap a shrink wrap material about products.

Description of Prior Art

It is known to provide a wrap of material about products such as to facilitate or otherwise improve product handling, transport and the like. To that end, it has become common to wrap product with a tube of heat shrink wrap film and then apply heat to effectively shrink the wrap about the product such as to form a packaged product. A common example of product so wrapped includes a plurality of articles such as beverage bottles or the like containers.

As will be appreciated, the resulting package product can result in a grouping of a plurality of articles that can be more easily or conveniently handled or transported, such as may include facilitating such handling or transporting via mechanical devices, for example. Further, the packaging can desirably prevent or avoid undesirable product contact such as by debris, dirt, dust and the like, for example.

The heating of a product wrapped with a tube of heat shrink wrap film is often conduct in an apparatus sometimes referred to a shrink wrap oven or tunnel. Typically, a load of product wrapped with a tube of heat shrink wrap film is introduced into the shrink wrap oven or tunnel via a conveyor passing through the shrink wrap oven or tunnel. As the load is passed through the shrink wrap oven or tunnel, heat such as supplied by a heater device is applied to the load via a blower with the heat acting to shrink the film through convection.

In current practice, such shrink wrap ovens or tunnels are typically placed just after another machine that groups articles together and wraps them in the heat shrinkable film. The film is wrapped around the product and either welded with a seam or the film overlaps underneath and must be welded in the shrink wrap oven or tunnel. At this point the film loosely covers the group of articles and must be shrunk with heat.

The flow of hot air in the oven or tunnel is or can be critical to the quality of the finished package. As the film-wrapped product enters the oven or tunnel, air blowing from discharge openings in the sides of the oven acts or serves to inflate the film and initiate heating of the film material. The load continues to travel through the oven and the heated film starts or begins to shrink. In practice, it is desirable that the film stay inflated like a bubble so the film does not contact the articles in the package until the last possible moment. If the film contacts the articles prematurely, the film can stop shrinking and will typically cause, produce or form undesirable wrinkling. Wrinkling, in addition to being generally cosmetically unattractive, can result in the product package to be weaker such as due to slackness in the film.

Current shrink oven designs typically apply blown air through a series of holes or discharge openings to inflate and shrink the film about the product. The applied air flow is turbulent and often will cause the film to flutter and prematurely contact the product. Because such applied air typically becomes more turbulent as distance from the discharge openings increases, conventional ovens must be adjusted for width in an effort to more carefully control the distance from the discharge openings to the film-wrapped product, i.e., the package being shrunk. Even when adjusted properly the air flow is typically still turbulent.

In view of the above, there is a need and a demand for improved heat shrink wrap product packaging apparatus and methods.

SUMMARY OF THE INVENTION

A general object of the invention is to provide an improved heat shrink wrap product packaging apparatus and methods.

In accordance with one aspect of the invention, an improved apparatus for heat shrink wrap product packaging is provided. In one embodiment, such an apparatus first and second opposed and spaced apart side wall assemblies. The first and second side wall assemblies define a longitudinally extending product conveyance path therebetween. The apparatus includes a conveyor to move product along the conveyance path. Each of the side wall assemblies include an inner wall spaced apart from an outer wall and define an air flow duct therebetween. Each of the inner walls includes an array of spaced apart air discharge openings directed towards and associated with the product conveyance path. The first and second side wall assemblies each includes an airfoil element for improved or increased control of the air flow from the air discharge openings in the respective inner wall. The apparatus further includes at least one heater/blower assembly disposed in the apparatus. The at least one heater/blower assembly is in heated air flow communication with the air flow duct of each of the side wall assemblies. A cover assembly is included and is disposed over and at least in part enclosing at least a section of the product conveyance path and at least a portion of the array of spaced apart air discharge openings directed towards and associated with the product conveyance path from the first and the second side wall assemblies.

In accordance with another aspect of the invention there is provided an improved method for shrink wrapping a product to form a packaged product. In one embodiment, such a method involves conveying product wrapped with a tube of heat shrink wrap film on a conveyor where the conveyor forms a conveyance path disposed between first and second opposed and spaced apart side walls. Streams of heated air are projected from the first and second opposed and spaced apart side walls and toward the wrapped product on the conveyance path. The projection of the streams of heated air from the first and second opposed and spaced apart side wall assemblies and toward the wrapped product on the conveyance path are advantageously controlled by application of a first airfoil element disposed in air flow communication control with the first side wall and a second airfoil element disposed in air flow communication control with the second side wall to shrink the tube of film onto the product to form the packaged product.

Other objects and advantages will be apparent to those skilled in the art from the following detailed description taken in conjunction with the appended claims and drawings.

DESCRIPTION OF PREFERRED EMBODIMENTS

The subject development provides improved heat shrink wrap product packaging apparatus and methods.

In accordance with one preferred aspect of the subject development, an airfoil is advantageously strategically disposed adjacent and in front of air discharge openings such as disposed in a shrink wrap oven or tunnel, with such air discharge openings directed towards and associated with a product conveyance path through the oven or tunnel. As described in greater detail below and in accordance with one preferred embodiment, such inclusion and utilization of an airfoil advantageously converts what would otherwise or normally be multiple, turbulent jets of air into smooth, preferably unified, laminar flow. As will be appreciated by those skilled in the art and guided by the teaching herein provided, the application and use of such a laminar air flow desirably avoids or prevents the shrink wrap film from undesirably fluttering prior to shrinkage and may desirably result in the film inflating, somewhat like a bubble, and so as to result in a final shrink wrapped package that is tighter and better looking. Moreover, the airflow resulting from or produced by the action of such an airfoil element can desirably remain smooth and laminar over a great distance eliminating the need in or with prior art shrink ovens or tunnels for width adjustment when changing package sizes.

Figure 1:
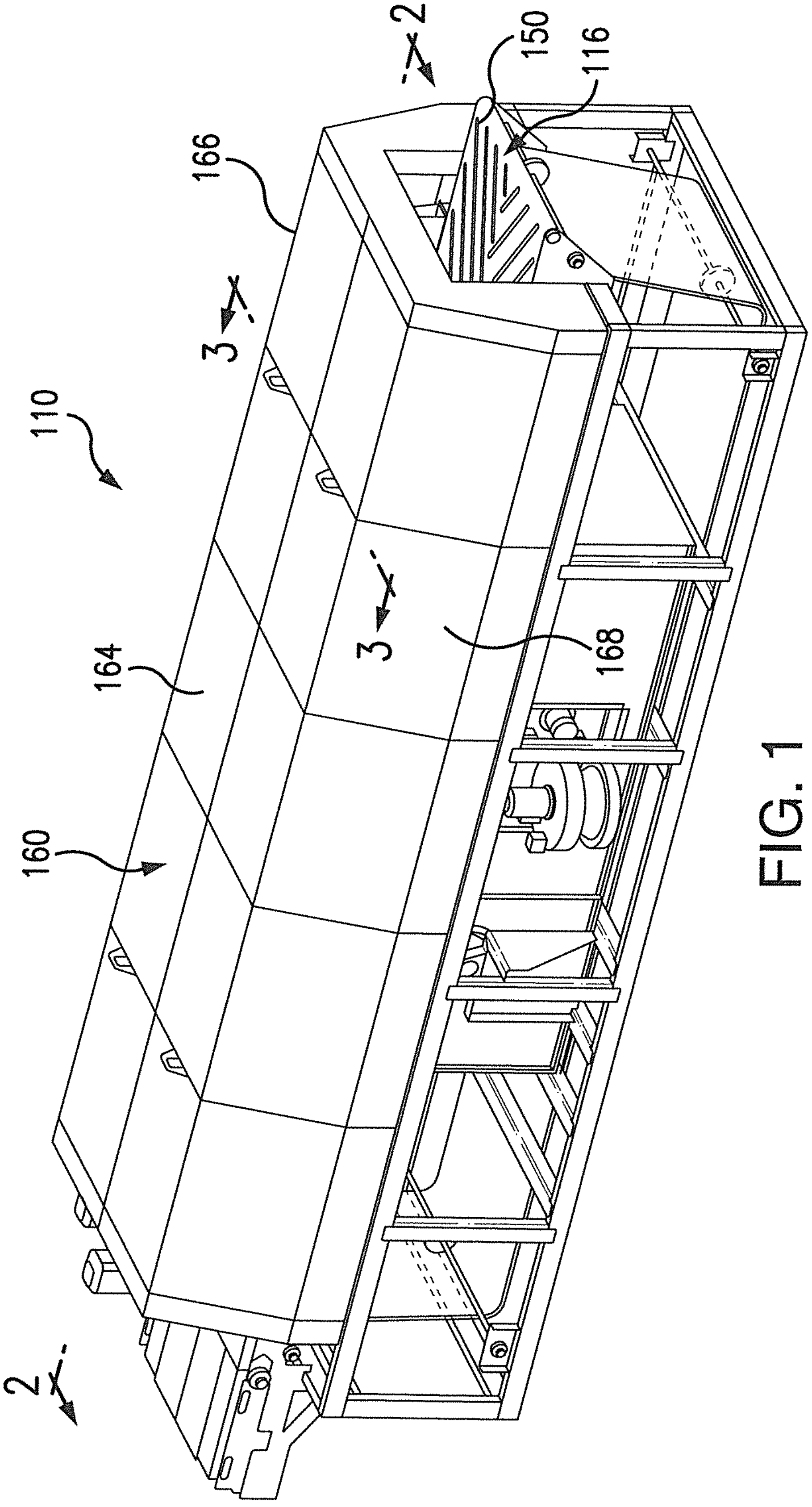
FIG. 1 is a perspective view of an apparatus for heat shrink wrap product packaging in accordance with one aspect of the subject development.
Figure 2:
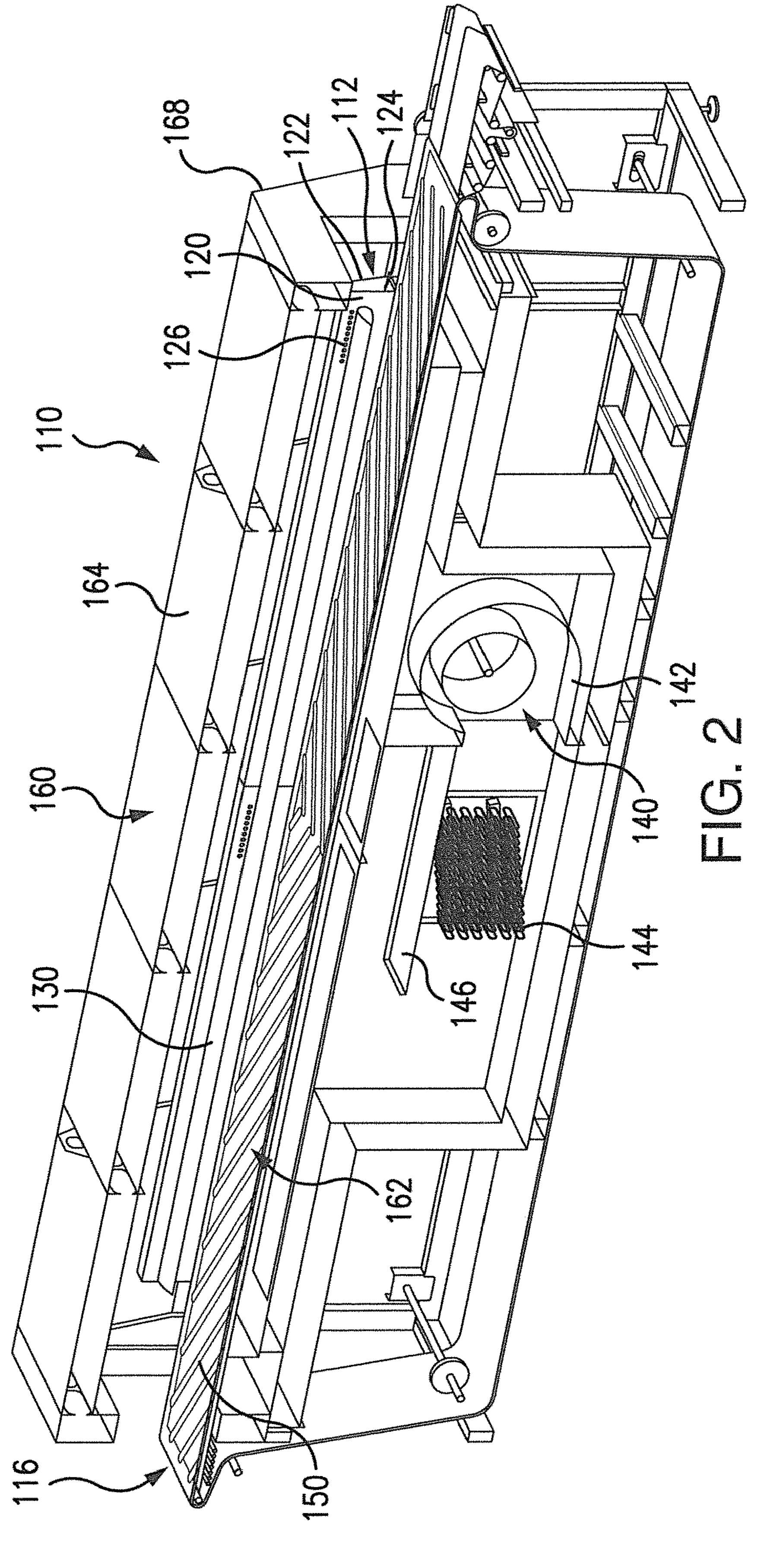
FIG. 2 is a simplified sectional view along the line 2-2 shown in FIG. 1.
Figure 3:
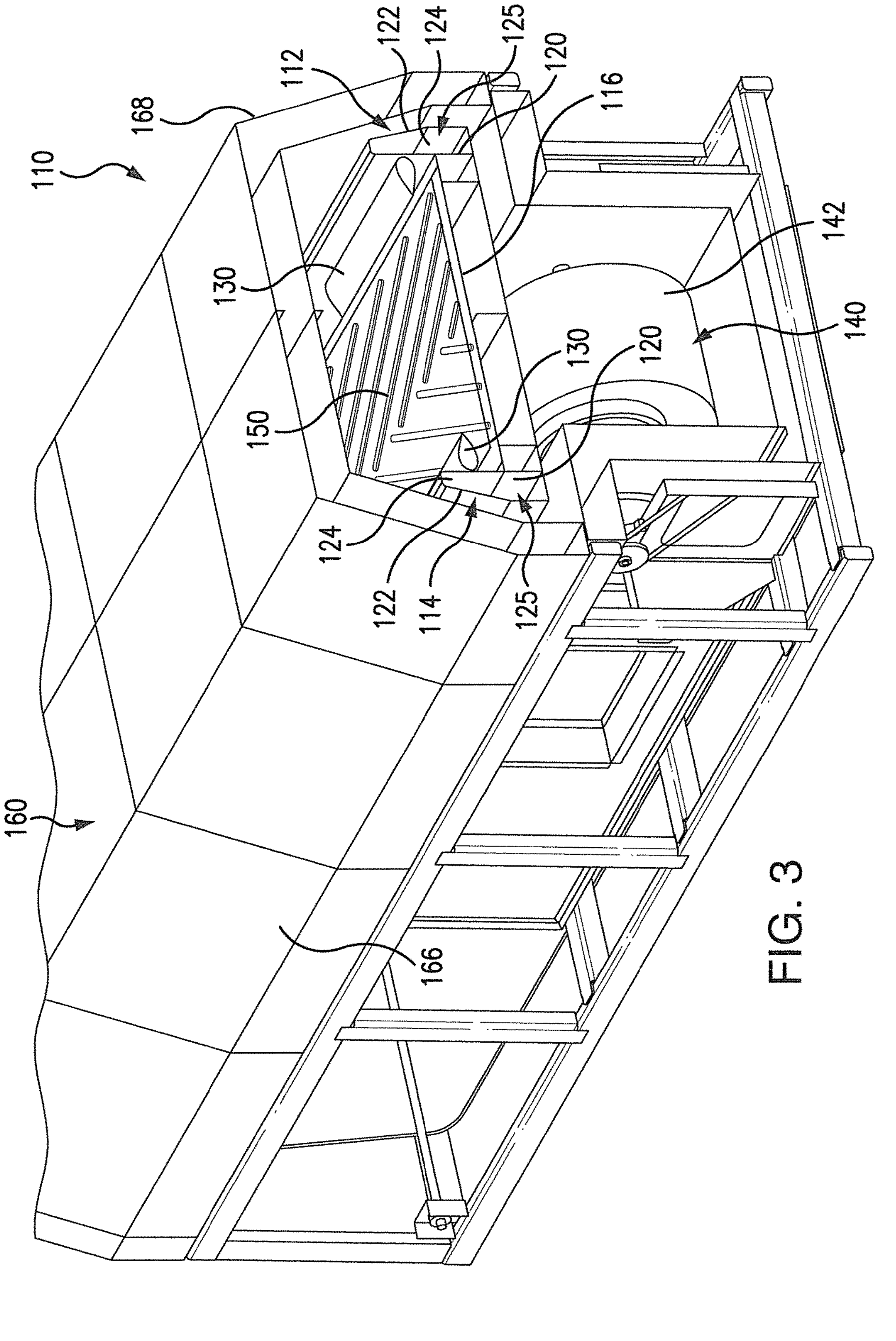
FIG. 3 is a simplified partial sectional perspective view along the line 3-3 shown in FIG. 1.

Turning to FIGS. 1-3, there is shown an apparatus, generally designated by the reference numeral 110, for heat shrink wrap product packaging in accordance with one aspect of the subject development. The apparatus 110 is of a type such as can be referred to as a shrink or shrink wrap oven or tunnel and through which product wrapped in plastic film is conveyed to shrink, e.g., heat shrink, the film to form a packaged product.

In an effort to enhance understanding and appreciation of the subject invention development, the drawings have been simplified and the description has been focused on distinguishing features. Thus in the drawings and associated description, normal or customary items for shrink or shrink wrap ovens or tunnels may not herein be specifically identified and discussed.

While beverage bottles or the like containers are an example of a common product that can be so processed to form a packaged product, those skilled in the art and guided by the teachings herein provided will understand and appreciate that the broader practice of the subject development is not necessarily so limited and a wide range of products such as known can, if desired, be suitably processed using the apparatus and methods herein provided.

The apparatus 110 includes first and second opposed and spaced apart side wall assemblies 112 and 114. The first and second side wall assemblies 112 and 114 defining a longitudinally extending product conveyance path 116 therebetween. In accordance with alternative embodiments, the conveyance path can be single or double track as may be desired for a particular application.

As will be appreciated, an apparatus such as herein provided can desirably be sized and adjusted to appropriately accommodate variously sized product packages. For example, an apparatus in accordance with one preferred embodiment, permits or accommodates processing of a package measuring 17 inches high and 38 inches wide.

Further, an apparatus in accordance with one preferred embodiment, has a capacity or permits processing of 100 cases of product packages per minute.

Each of the side wall assemblies 112 and 114 include an inner wall 120 spaced apart from an outer wall 122 and define an air flow duct 124 therebetween and to form what is sometimes referred to as an air box 125. Each of the inner walls 120 including an array of spaced apart air discharge openings 126 that are directed towards and associated with the product conveyance path 116. The first and second side wall assemblies 112 and 114 each include an airfoil element 130, discussed in greater detail below, for air flow control from the air discharge openings 126 in the respective inner wall.

The apparatus 110 further includes and a heater/blower assembly, generally designated by the reference numeral 140. The heater/blower assembly 140 can suitably include a blower 142 and a heating element or device 144, such as known in art, for example. Heating elements or devices for use in accordance with certain embodiments can suitably be or take the form of being gas-powered or electric-powered, as may be desired for a specific or particular application.

The apparatus 110 further includes suitable conduits or connections such as may form a plenum including air flow ducts 146 such that the heater/blower assembly 140 is in heated air flow communication with the air flow duct of each of the side wall assemblies 112 and 114, respectively.

The apparatus 110 includes a conveyor 150 to move product along the conveyance path 116 longitudinally extending between the side wall assemblies 112 and 114, respectively.

The apparatus 110 also includes a cover assembly 160. As shown, the cover assembly 160 is desirably disposed over and at least in part encloses at least a section 162 of the product conveyance path 116 and at least a portion of the array of spaced apart air discharge openings 126 directed towards and associated with the product conveyance path 116 from the first and the second side wall assemblies 112 and 114, respectively.

The cover assembly 160 includes a top portion 164 and opposed lateral side wall portions 166 and 168 such as to enclose the section 162 of the product conveyance path 116. In accordance with on preferred embodiment, the cover assembly desirably is of a monocoque construction. As will be appreciated by those skilled in the art and guided by the teachings herein provided, the incorporation and use of a cover assembly of monocoque construction can one or more of: eliminate welding, reduce weight and/or reduce costs.

Figure 5:
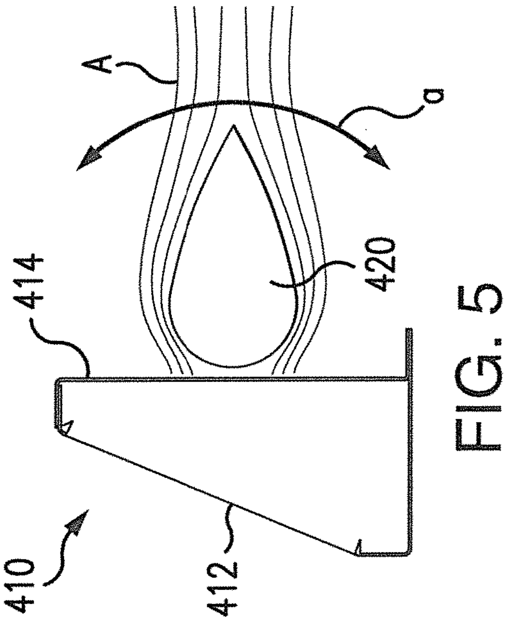
FIGS. 4 and 5 are simplified perspective and end views, respectively, showing hot air discharge from an oven side wall assembly having an airfoil element attachment as provided herein in a preferred embodiment.
Figure 4:
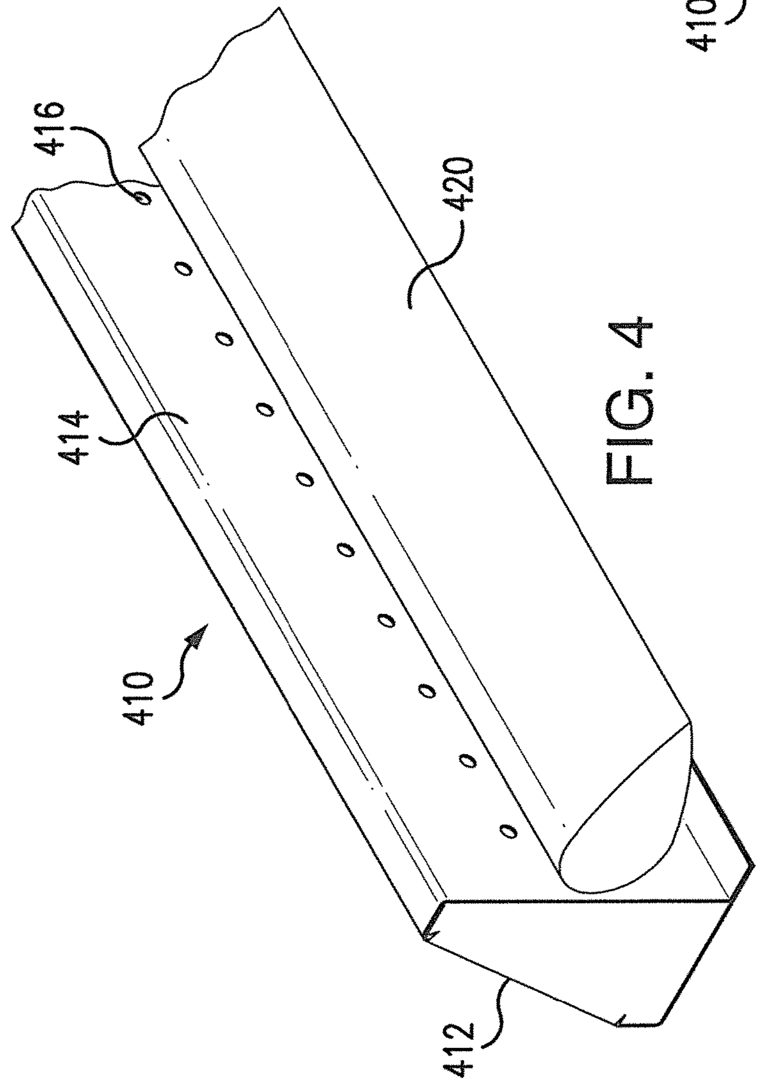

To better understand and appreciate operation of a shrink or shrink wrap oven or tunnel in accordance with one embodiment of the subject development, reference is now made to FIGS. 4 and 5 which illustrates hot air (A) (shown in FIG. 5) flow with an oven side wall assembly 410 generally composed of an outer wall 412 and an inner wall 414, having a plurality of hot air discharge openings 416 such as formed in an array of two lines or rows of openings, with only one row viewable in FIG. 4, and further including an airfoil element attachment 420. As shown in this illustrated embodiment, the airfoil element 420 generally includes a front face portion 421 and a trailing edge portion 422. Further, the foil element is desirably moveable, e.g., rotatably attached, relative to the sidewall inner wall 414 such that the angle ($\alpha$) of the airfoil element 420 relative to the side wall inner wall 414 and the hot air discharge openings 416 can be selectively adjusted and/or set, as may be desired for particular applications. As shown in FIG. 5, through the inclusion of the airfoil attachment 420, the hot air (A) discharge from an oven side wall assembly 410 produces or results in a laminar flow of the air (A). For example, in accordance with one embodiment, the hot air (A) discharge from the oven side wall assembly 410 contacts the airfoil attachment 420 such as at or in the front face portion 421, at the top and bottom. The air then flows over the airfoil 420 to the thin trailing edge 422. When the air leaves the trailing edge 422, it desirably flows smoothly and non-turbulently over a great distance. In accordance with one preferred embodiment, the airfoil attachment is desirably rotatably angle adjusted dependent on factors such as the size of the package being processed so as to suitably inflate the film without disturbing the edge of the film. For example, the airfoil attachment may be desirably rotated upward for taller packages or downward for shorter packages.

Figure 7:
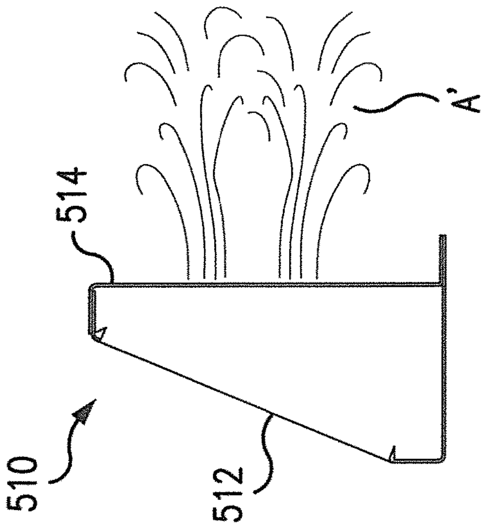
FIGS. 6 and 7 are simplified perspective and end views showing hot air discharge from an oven side wall assembly without inclusion of an airfoil element attachment such as herein provided.
Figure 6:
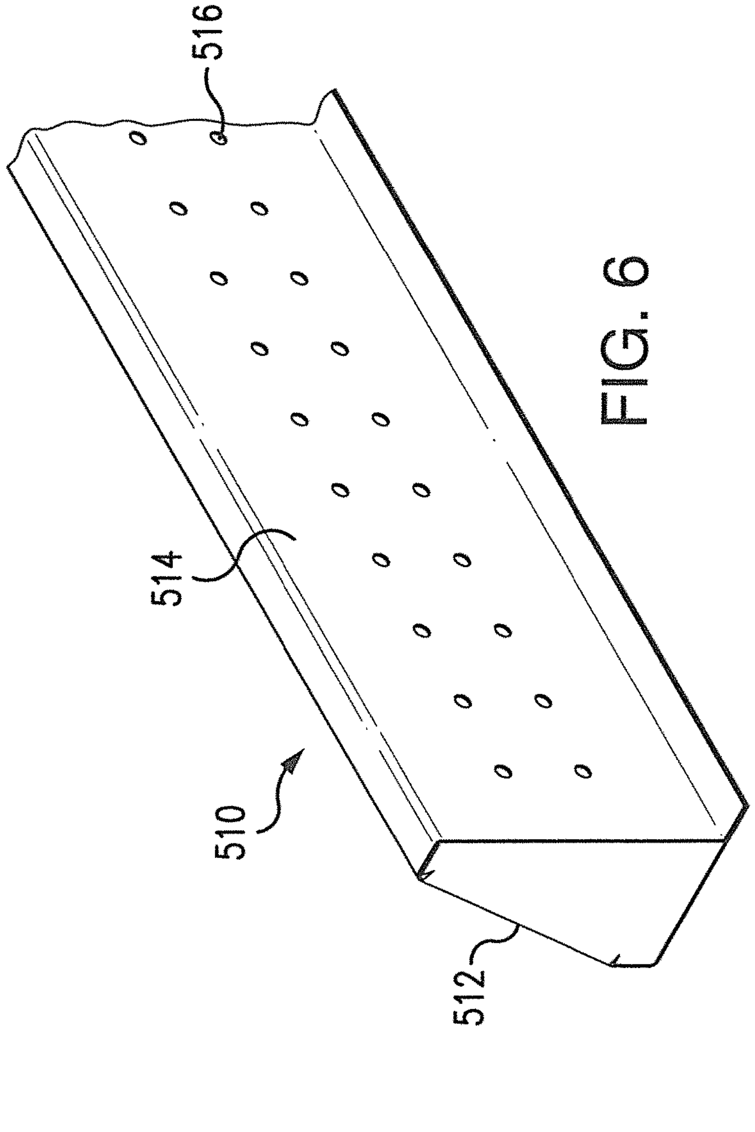

For purposes of comparison, reference is made to FIGS. 6 and 7 which illustrates hot air (A') flow from an oven side wall assembly 510 without inclusion of an airfoil attachment such as provided herein in accordance with one preferred embodiment. The oven side wall assembly 510, similar to the oven side wall assembly 410 described above, includes an outer wall 512 and an inner wall 514, having a plurality of hot air discharge openings 516 such as formed in an array of two lines or rows of openings. As shown in FIG. 7, the hot air (A') (shown in FIG. 7) discharge from the oven side wall assembly 510 produces or results in a turbulent flow of the air (A'). As will be appreciated by those skilled in the art, such turbulent air flow makes controllable heat shrink processing therewith much more difficult and challenging than may be desired and consequently can produce or result in either significantly greater than desired loss of product through unacceptable packaging or increased processing time to avoid improper packaging or required repackaging, if possible.

To better understand and appreciate operation of a shrink or shrink wrap oven or tunnel in accordance with one embodiment of the subject development, reference is now made to FIGS. 8-13.

Figure 8:
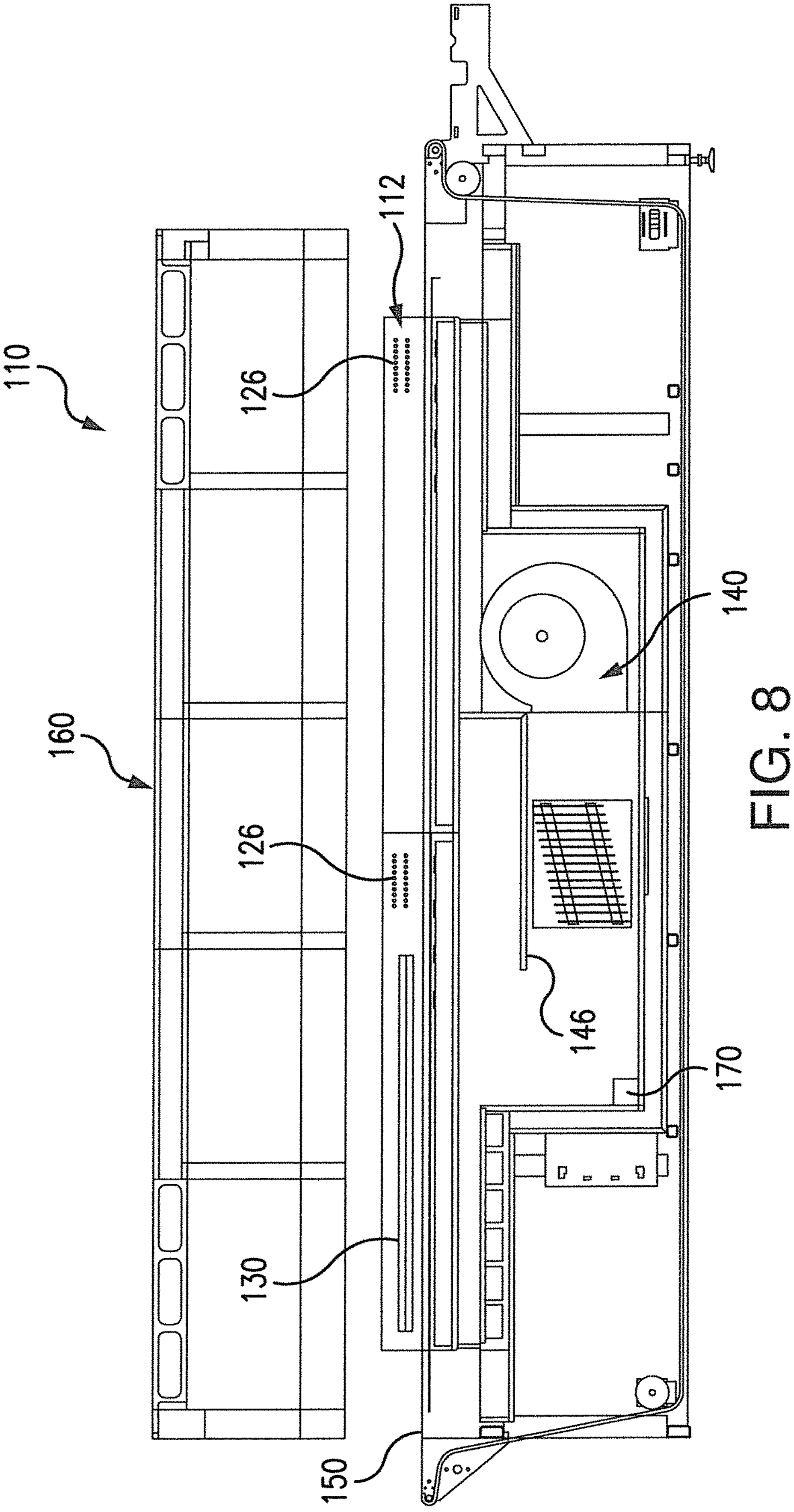
FIG. 8 is a partially exploded simplified cross sectional side view of an apparatus for heat shrink wrap product packaging in accordance with one aspect of the subject development.
Figure 9:
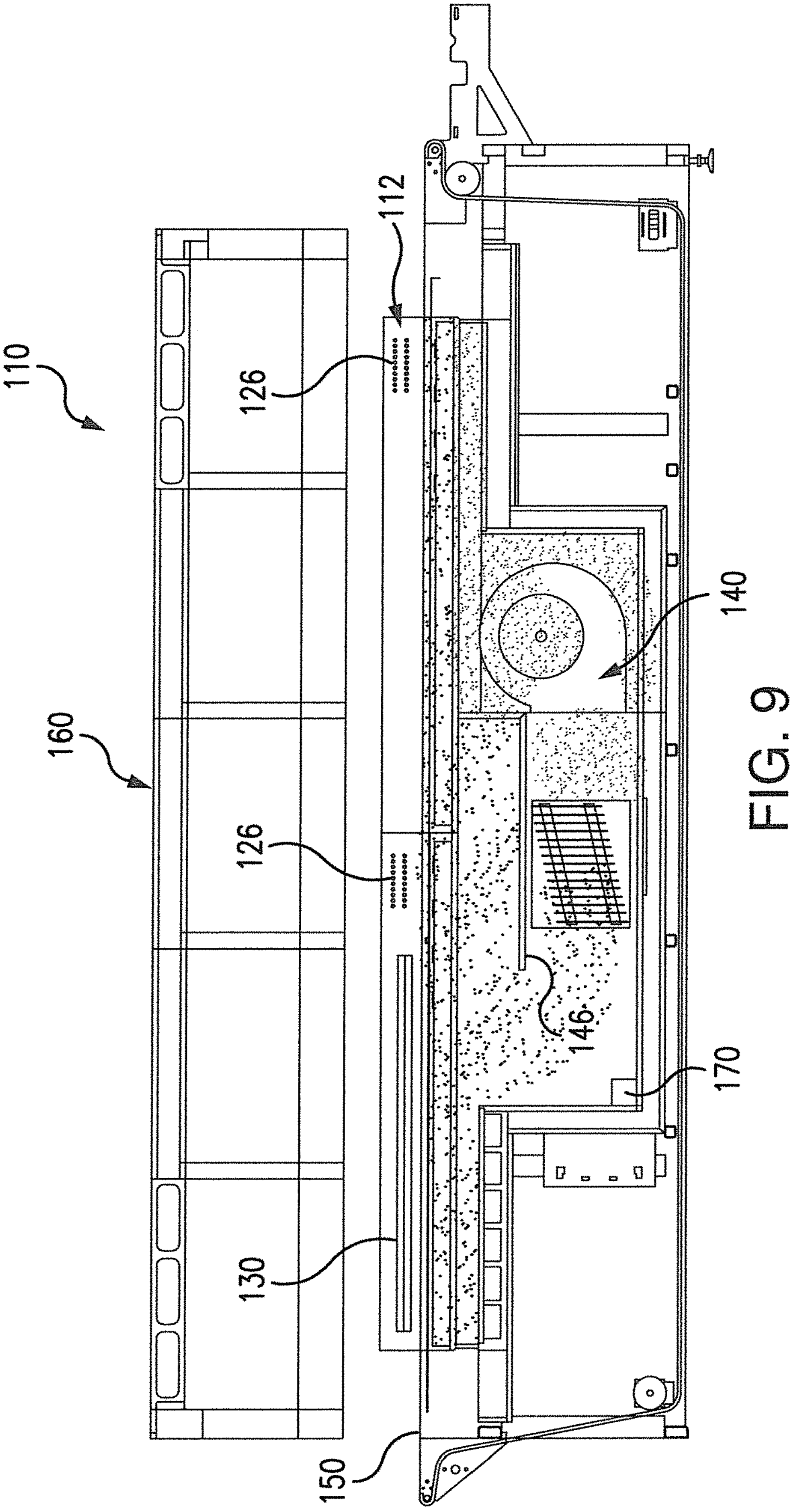
FIG. 9 is a partially exploded simplified cross sectional side view of an apparatus for heat shrink wrap product packaging in accordance with one aspect of the subject development and showing or signifying the air flow within the apparatus.
Figure 10:
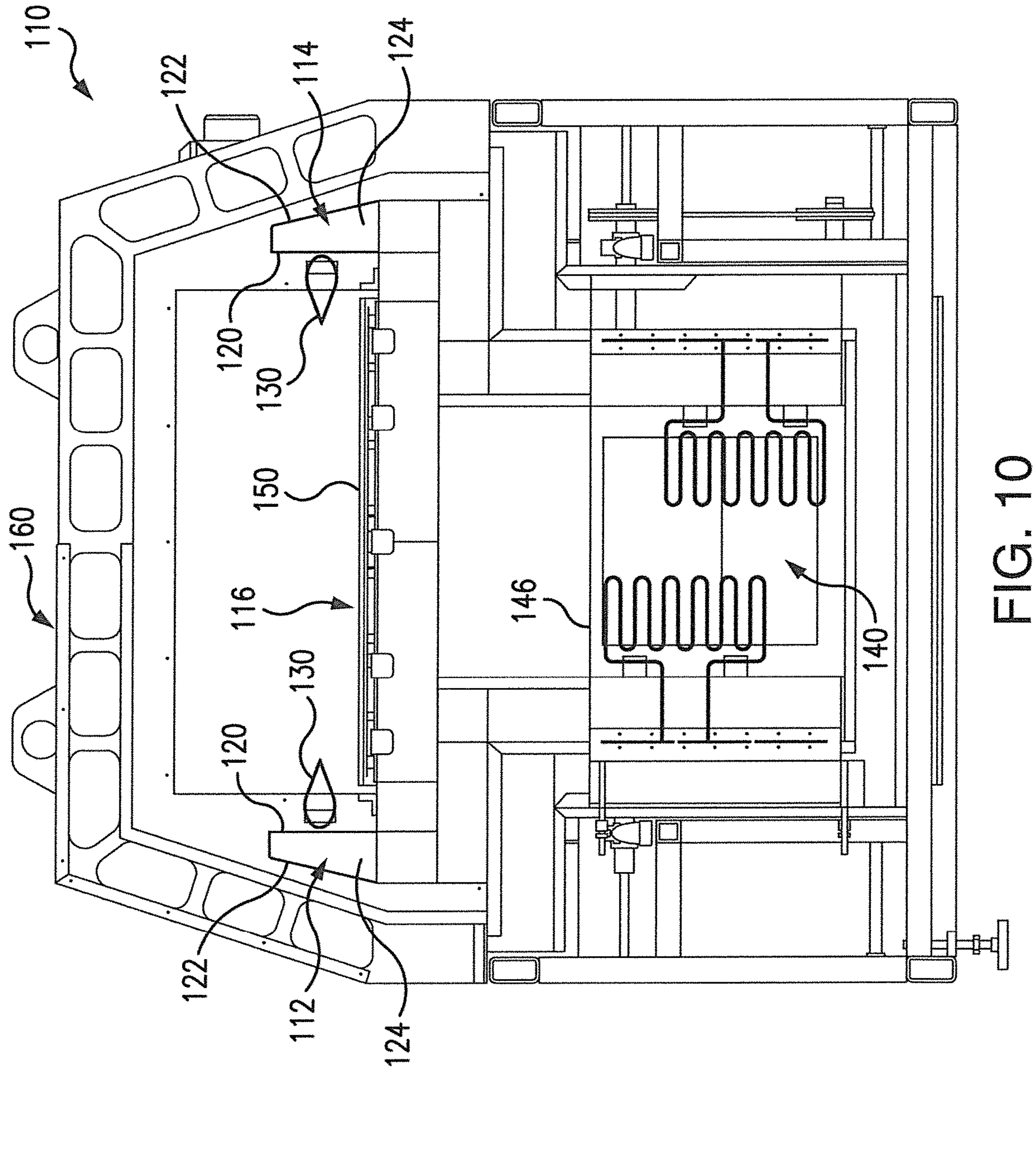
FIG. 10 is a simplified cross sectional end view of an apparatus for heat shrink wrap product packaging in accordance with one aspect of the subject development.
Figure 11:
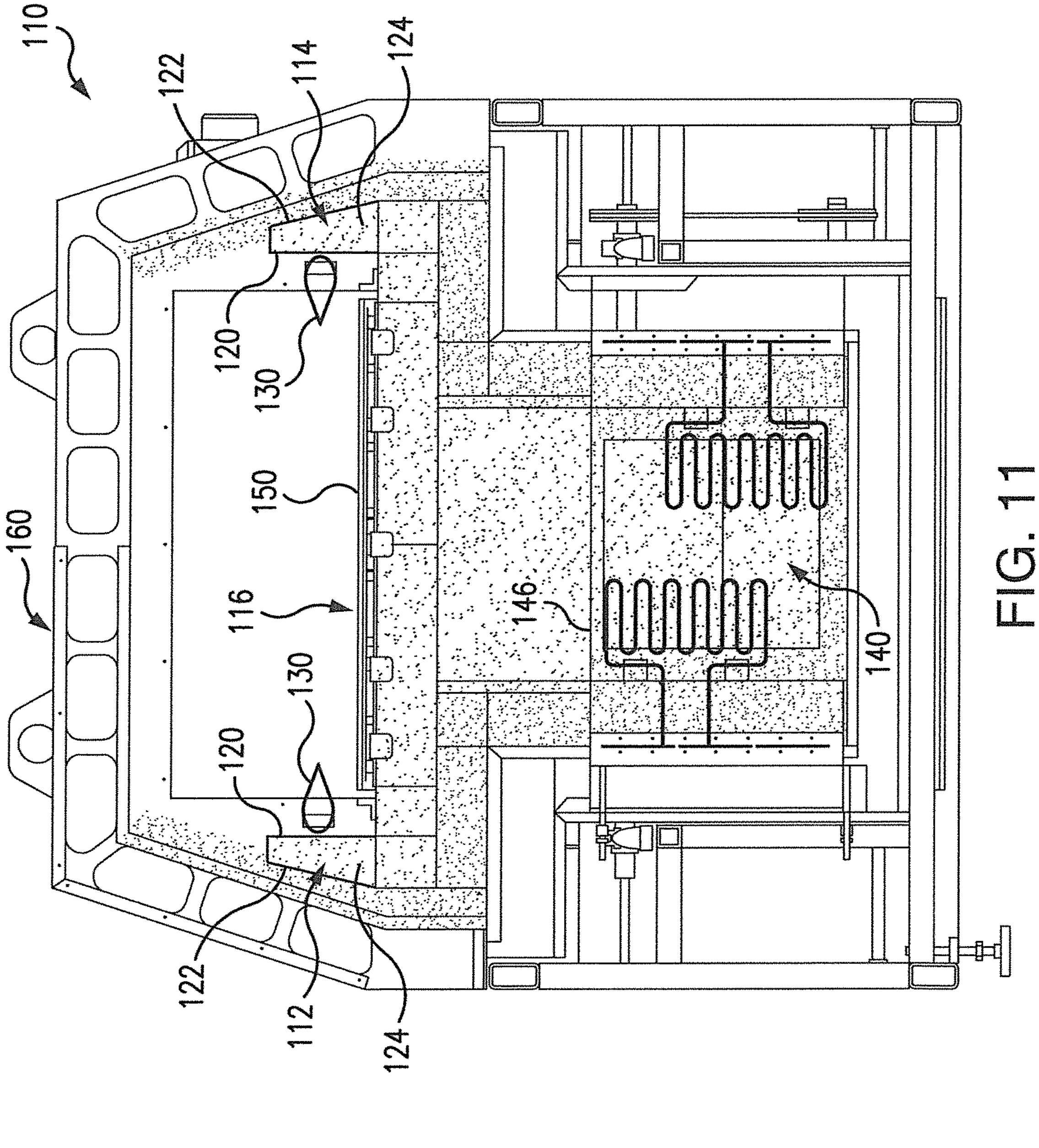
FIG. 11 is a simplified cross sectional end view of an apparatus for heat shrink wrap product packaging in accordance with one aspect of the subject development and showing or signifying the air flow within the apparatus.

FIGS. 8 and 10 show a partially exploded simplified cross sectional side view and a simplified cross sectional end view, respectively, of an apparatus 110 for heat shrink wrap product packaging in accordance with one aspect of the subject development. FIGS. 9 and 11 generally correspond to FIGS. 8 and 10, respectively, but further show or signify the air flow within the apparatus 110. To enhance understanding, FIGS. 8 and 9 have been simplified to show the airfoil element 130 as well as the air discharge openings 126 as extending for only a portion of the length of the oven and particularly the side wall assembly 120. In one preferred embodiment, the airfoil element desirably extend the entire length of the air discharge opening portion of an associated side assembly.

More particularly, these drawings illustrate the heat shrink oven or tunnel apparatus 110, the first and second opposed and spaced apart side wall assemblies 112 and 114, the longitudinally extending product conveyance path 116, the side wall assemblies inner wall 120, the side wall assemblies outer wall 122, the air flow duct 124, air discharge openings 126, airfoil elements 130, the heater/blower assembly 140 and associated air flow ducts 146, conveyor 150 and cover assembly 160.

Further, FIG. 8 schematically illustrates the inclusion of a pressure sensor assembly, generally designated by the reference numeral 170, such as may be desired in accordance with one aspect of the subject development. For example, to keep a consistent air flow in the oven the pressure sensor assembly 170 can serve to control the fan speed to maintain a constant pressure in the plenum. When baffles are opened, or closed this changes the pressure behind the air boxes. The speed of the fan can then be appropriately adjusted to maintain the desired air pressure in the box. As will be appreciated by those skilled in the art and guided by the teachings herein provided, a constant or consistent pressure plenum is an important feature because when an air adjustment is made in a typical shrink oven with a constant speed fan, everything else is affected. For example, in such a typical shrink oven, the opening of a baffle would reduce the pressure and reduce airflow elsewhere in the system.

Figure 12:
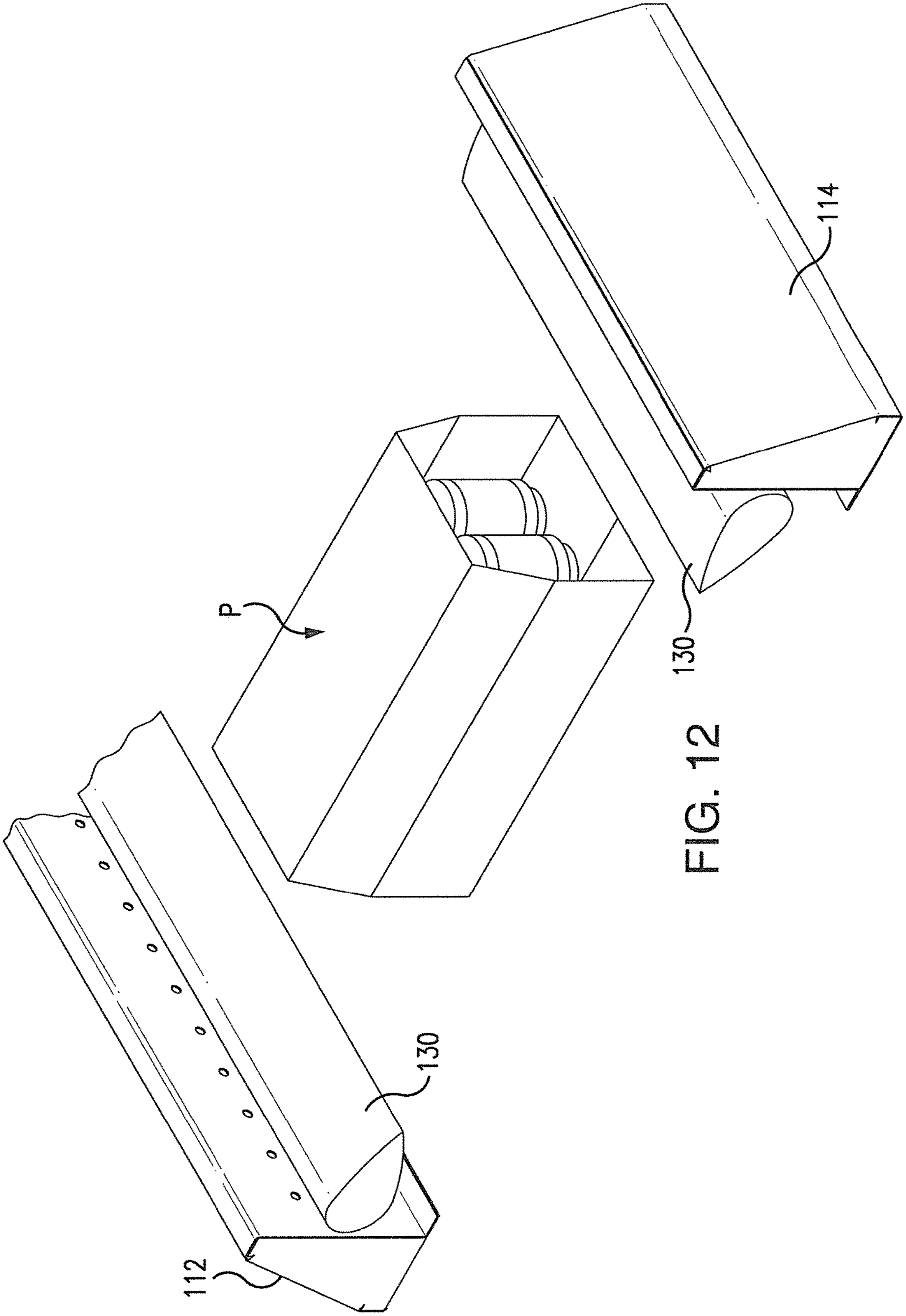
FIG. 12 is a simplified fragmentary perspective view showing product placement between oven apparatus side walls in accordance with one aspect of the subject development.
Figure 13:
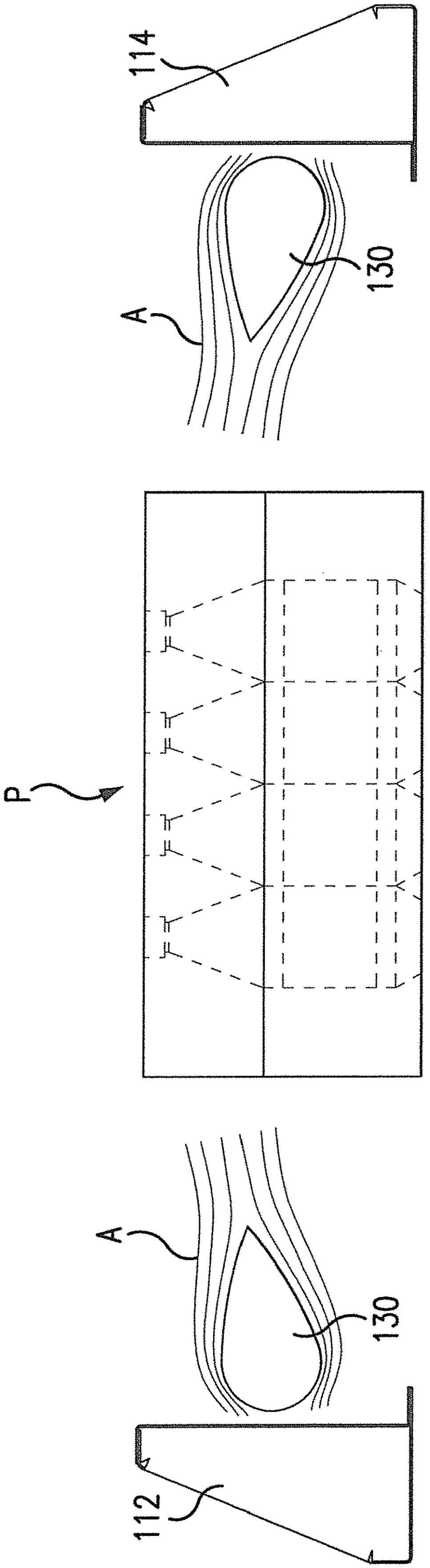
FIG. 13 is a simplified end view showing product placement between oven apparatus side walls in accordance with one aspect of the subject development.

FIGS. 12 and 13 show positioning or placement of a sample or exemplary product (P) between oven apparatus side wall assemblies 112 and 114, respectively, in accordance with one aspect of the subject development. In this illustrated embodiment, the exemplary product (P) is shown as generally composed of product in the form of a plurality of articles, e.g., bottles, wrapped with a tube of heat shrink wrap film.

The side wall assemblies 112 and 114 each include an airfoil element 130 in accordance with an aspect of the subject development. FIG. 13 illustrates the hot air flow (A) from the side wall assemblies 112 and 114 each having an airfoil element 130 in accordance with a preferred aspect of the subject development. As shown, the hot air flow (A) is, as described above, laminar.

The use of an airfoil positioned or placed adjacent and in front of the series of discharge openings or holes, as provided by the subject development, converts the multiple, turbulent jets of air provided by or resulting from the discharge openings into one smooth laminar flow. As identified above, such laminar air flow avoids or prevents the heat shrink wrap film from undesirably fluttering during processing and causes the film to inflate like a bubble, making or resulting a tighter and better looking package. The airflow also desirably remains smooth and laminar over a greater or extended distances eliminating the need for width adjustment when changing package sizes.

Figure 14:
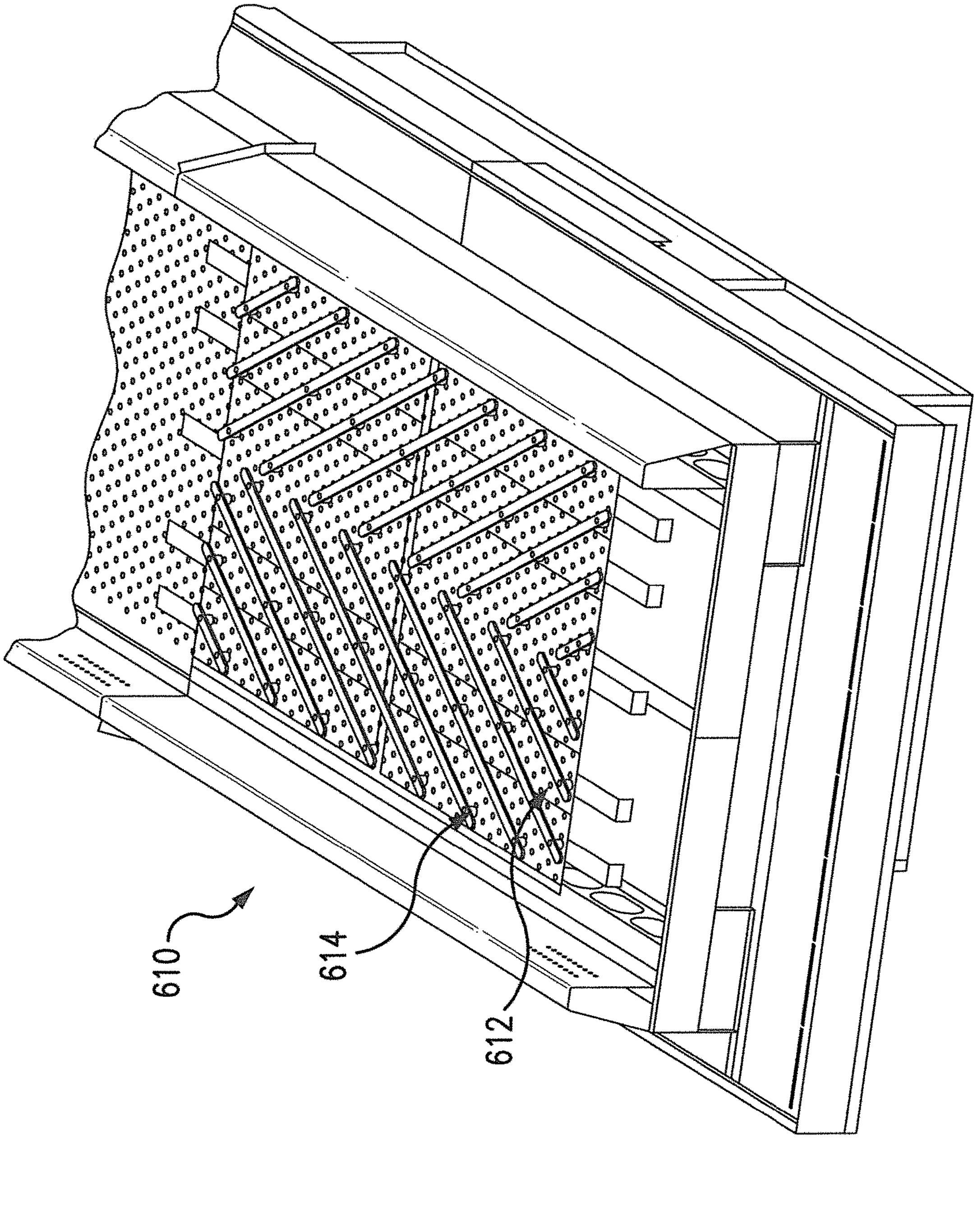
FIG. 14 is a perspective view of a slatted surface such as underlies the conveyor surface in accordance with one aspect of the subject development.

FIG. 14 illustrates a slatted surface 610 such as underlies the conveyor surface in accordance with one aspect of the subject development. The slatted surface 610 is generally composed of a plurality of longitudinally extending slats 612 such that the flow of hot air from below and through the discharge openings 614 can be specifically controlled from underneath such that the hot air flow can be tailored and directed to correspond to the size of the package being processed. That is, different lanes of the slated surface can desirably be opened or closed.

In one preferred practice of the subject development, such as where the goal is to seal the bottom of the film without disturbing the film on the sides of the package, slats directly under the package will desirably be open and the others will be closed. Thus, a bigger package will in general necessitate more lanes being open.

Figure 15:
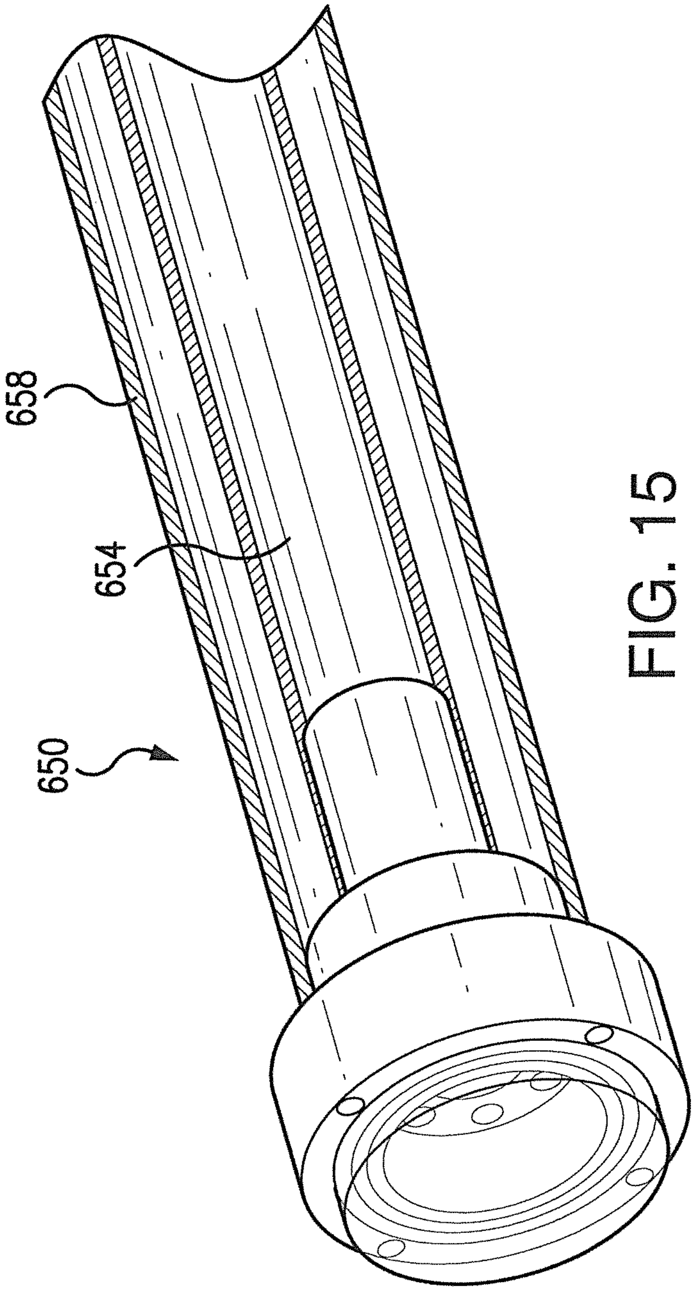
FIG. 15 is a perspective view of a camera device for inclusion in an apparatus for heat shrink wrap product packaging in accordance with one aspect of the subject development.

FIG. 15 illustrates a camera device 650 for inclusion in an apparatus for heat shrink wrap product packaging in accordance with one aspect of the subject development. The camera device 650 is an air cooled camera such as may be appropriately placed or positioned within an apparatus for heat shrink wrap product packaging in accordance with one aspect of the subject development and such as may be desired to view the package during the shrink wrap processing. In the illustrated embodiment, the camera device 650 includes an inner silicone air supply and wire conduit 654 and an outer stainless tube 658 for mounting and return air transmission.

Figure 16:
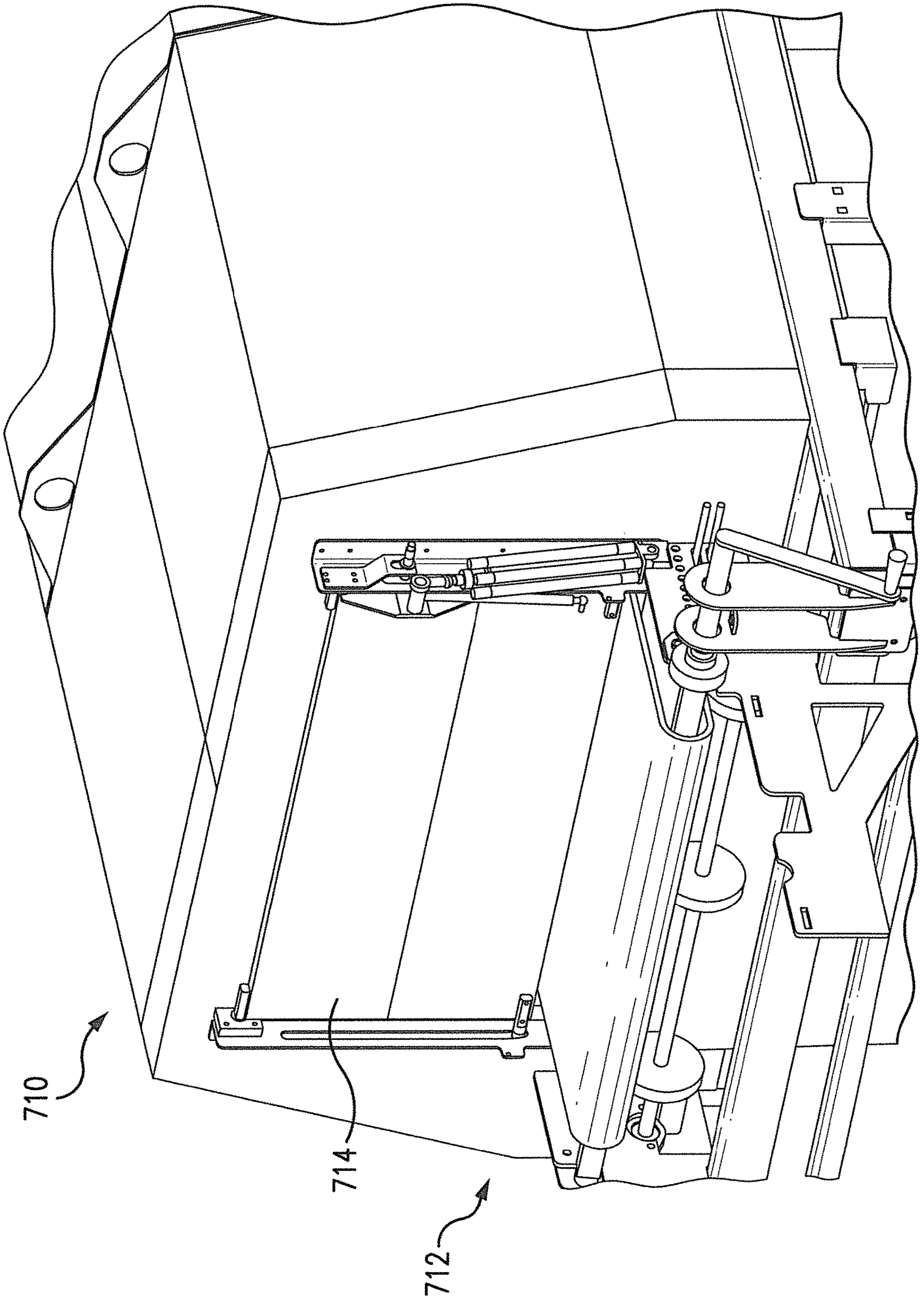
FIG. 16 is a fragmentary perspective view of an apparatus for heat shrink wrap product packaging showing a fail-safe door on an end of oven in a closed position in accordance with one aspect of the subject development.
Figure 17:
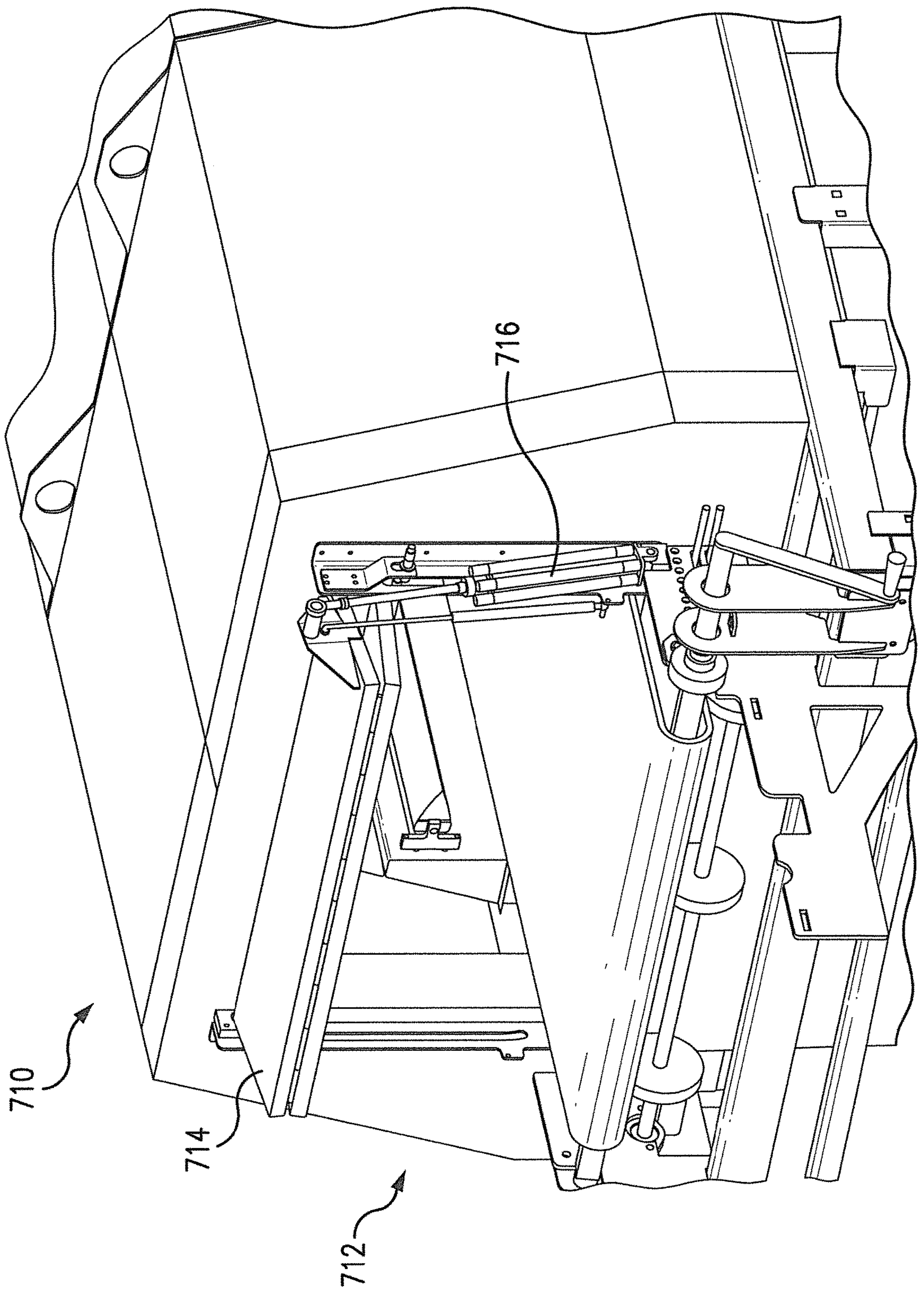
FIG. 17 is a fragmentary perspective view of an apparatus for heat shrink wrap product packaging showing a fail-safe door on an end of oven in an open position in accordance with one aspect of the subject development It is to be understood that in the drawings, like reference characters designate like or corresponding parts throughout the several views. It is to be further understood that certain standard elements not necessary for an understanding of the invention may have been omitted or removed from the drawings and description for purposes of facilitating and enhancing illustration and/or comprehension.

FIGS. 16 and 17 illustrate a shrink wrap oven or tunnel apparatus 710, particularly a product entry end 712 of the apparatus 710, in accordance with another aspect of the subject development. The apparatus 710 is generally similar to the apparatus 110 described above and generally useful in or for heat shrink wrap product packaging. The apparatus 710, however, includes fail-safe doors 714 on the opposed ends of the oven such as at the ends of the conveyance path. While FIGS. 16 and 17 show the fail-safe door 714 on or at the product entry end 712, it is to be understood that in a preferred practice a similar or corresponding door is also appropriately disposed on or at the product exit end (not shown) of the oven conveyor apparatus 710. The doors 714 so installed and situated desirably serve to retain heat in apparatus when product flow is idle. In contrast to energy saving doors that simply open and close automatically, the fail-safe doors 714 desirably automatically open in the event of a power failure and/or loss of air pressure. This is important because product or other material left inside a stopped heated oven will melt or burn and must be removed and appropriately discarded. Under normal operation, when desired, the fail-safe doors 714 can be appropriately closed such as via the appropriate application air pressure. However, when, for example, power has been lost, the fail-safe doors 714 are desirably raised or opened such as via application of associated gas-spring elements 716.

Heat shrink wrap product packaging apparatus and methods, such as herein provided, can or may include or incorporate various features such as to desirably provide, produce or otherwise result in various benefits in accordance with selected aspects of the subject development as compared to conventional heat shrink wrap product packaging apparatus and methods.

For example, heat shrink wrap product packaging apparatus and methods in accordance with one aspect of the subject development include or incorporate, as described above, airfoils useful in airflow control. Such incorporation and utilization of airfoil elements can desirably result or produce in one or more of: fewer required adjustments to made to the apparatus or processing; permit quicker change overs such as when changing the kind or size of the product being processed; better looking packaging; eliminate the need to for air blade controls; easier to understand adjustments, etc.

Heat shrink wrap product packaging apparatus and methods in accordance with one aspect of the subject development desirably include or incorporate larger tunnel air duct as compared to conventional shrink wrap product packaging apparatus and methods. Such larger tunnel air ducts desirably produce or result in reduced or lower restrictions on flow and thus relatively reduce or lower the pressure required at the blower. As a result, the apparatus and methods can desirably provide or result in quieter operation and/or reduced power consumption.

Heat shrink wrap product packaging apparatus and methods in accordance with one aspect of the subject development desirably include or incorporate a plastic chain mesh conveyor surface. Such incorporation and use of plastic chain mesh conveyor surface can assist in producing or resulting in good seal of the heat shrink film on the bottom of packages by allowing hot air to better flow through the chain.

In some embodiments, a metal mesh chain is desirably employed. In practice, such a metal chain typically has a shorter pitch, usually about 0.5 inch as compared to a plastic chain such as having a 1 inch pitch. The utilization of such a metal mesh chain may, for example, be desired for use in conjunction with the processing of products that may be relatively less stable on a moving conveyance surface. As will be appreciated by those skilled in the art and guided by the teachings herein provided, the conveyance and transfer onto and off of relatively unstable bottles may desirably be facilitated by or through the use of a short pitch chain.

Thus, ovens in accordance with the subject development may alternatively be available with plastic or metal chain.

Heat shrink wrap product packaging apparatus and methods in accordance with one aspect of the subject development desirably include or incorporate a plastic chain in conjunction with operation of the conveyor. Such incorporation and use of plastic chains can desirably assist in one or more of: reduce cost, facilitate maintenance, eliminate the need for a lube system, and/or eliminate the need for a chain scrubber, for example.

Heat shrink wrap product packaging apparatus and methods in accordance with one aspect of the subject development desirably include or incorporate a single blower and heater. Such incorporation and use of a single blower and heater can desirably reduce one or more of: cost, required controls, and/or required maintenance.

Heat shrink wrap product packaging apparatus and methods in accordance with one aspect of the subject development desirably include or incorporate the single or more blower or heater disposed within the apparatus such as below the conveyance path. Such placement or positioning desirably can produce or result in one or more of: facilitating maintenance, reducing the required footprint of the apparatus or processing, and/or increase safety by eliminating the need for a worker to climb on top of the apparatus, as may be required by some current designs.

Heat shrink wrap product packaging apparatus and methods in accordance with one aspect of the subject development desirably include or incorporate tunnel heat doors. Such incorporation and use of tunnel heat doors desirably can produce or result in one or more of: increase efficiency, reduce radiant heat loss and/or provide a more comfortable work environment, for example.

Heat shrink wrap product packaging apparatus and methods in accordance with one aspect of the subject development desirably reduce the length of the required tunnel by moving heated air closer to the tunnel ends. Such apparatus and methods can desirably reduce the required processing footprint, for example.

Heat shrink wrap product packaging apparatus and methods in accordance with one aspect of the subject development desirably move or shift product cool down fans to a following customer conveyor. Such move or shift of product cool down fans to a following customer conveyor can desirably reduce one or more of the required length of tunnel chain and processing footprint and/or costs (e.g., processing and product cost).

Heat shrink wrap product packaging apparatus and methods in accordance with one aspect of the subject development desirably avoid or eliminate incorporation and use of flexible ducts. Such avoidance or elimination of flexible ducts can reduce or eliminate equipment and processing maintenance and costs.

Heat shrink wrap product packaging apparatus and methods in accordance with one aspect of the subject development desirably include or incorporate bottom slats such as to help control the placement of air under the package. The inclusion and use of such bottom slats can desirably serve to better ensure sealing of the bottom of the film wrap without disturbing the film on the sides of the package.

Heat shrink wrap product packaging apparatus and methods in accordance with one aspect of the subject development desirably include or incorporate an appropriate pressure sensor assembly such as to desirably achieve and maintain a consistent air flow in the oven such as by controlling the fan speed to maintain a constant pressure in the plenum of the apparatus.

Heat shrink wrap product packaging apparatus and methods in accordance with one aspect of the subject development desirably include or incorporate fail-safe doors on ends of oven so as to retain heat in apparatus when product flow is idle yet automatically open in the event of a power failure and/or loss of air pressure.

It is to be further understood and appreciated that the numerous above-identified and/or described features of the subject product packaging apparatus and methods can be appropriately practiced alone or individually or in various combinations as may be desired for a particular or specific application.

Those skilled in the art and guided by the teachings herein provided will understand and appreciate that the broader practice of such aspect of the subject development is not necessarily limited to camera devices so constructed or operated as camera devices of alternative construction or operation can, if desired, be appropriately incorporated and utilized herewith.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An apparatus for heat shrink wrap product packaging, the apparatus comprising:

first and second opposed and spaced apart side wall assemblies, the first and second side wall assemblies defining a longitudinally extending product conveyance path therebetween, each of the side wall assemblies including an inner wall spaced apart from an outer wall and defining an enclosed air flow duct therebetween, each of the inner walls including an array of spaced apart air discharge openings direct towards and associated with the product conveyance path, the first and second side wall assemblies each including an airfoil element with a tapered edge, for air flow control from the air discharge openings in the respective inner wall, wherein the airfoil elements provide laminar air flow over the airfoil elements toward and across the tapered edge and to product along the conveyance path;

at least one heater/blower assembly disposed in the apparatus and in heated air flow communication with the air flow duct of each of the side wall assemblies;

a cover assembly disposed over and at least in part enclosing at least a section of the product conveyance path and at least a portion of the array of spaced apart air discharge openings directed towards and associated with the product conveyance path from the first and the second side wall assemblies; and a conveyor to move product along the conveyance path.

2. The apparatus of claim 1 wherein the airfoil elements provide laminar air flow over the airfoil elements to toward and across the tapered edge edged and to product along the conveyance path.

3. The apparatus of claim 1 wherein the airfoil elements are each movable relative to the respective side wall assembly inner wall.

4. The apparatus of claim 3 wherein the airfoil elements are each rotatably attached to the respective side wall assembly inner wall configured to rotate at a plurality of angles.

5. The apparatus of claim 3 wherein the airfoil elements with the tapered edges are each movable relative to the respective side wall assembly inner wall to vertically alter an impact point onto product and directionally convey air from the discharge openings on the conveyance path based on an angular position of the airfoil elements.

6. The apparatus of claim 1 wherein the device include only a single heater/blower assembly.

7. The apparatus of claim 6 wherein said single heater/blower assembly is disposed below the conveyance path.

8. The apparatus of claim 1 wherein the cover assembly is of monocoque construction.

9. The apparatus of claim 1 wherein the apparatus is free of cooling fans.

10. The apparatus of claim 1 additionally comprising at least on camera to permit viewing inside at least a portion of the enclosed section of the product conveyance path.

11. The apparatus of claim 1 wherein the conveyor comprises a conveyor surface comprising plastic chain mesh.

12. The apparatus of claim 1 wherein the conveyor comprises a conveyor surface comprising a chain mesh, the apparatus further comprising a heated air chamber at least partially underlying the conveyor surface with a slatted surface disposed between the heated air chamber and the conveyor surface, the slatted surface comprising a plurality of apertures that can be selectively opened and closed to regulate air flow from the heated air chamber to the conveyor surface.

13. The apparatus of claim 1 wherein the at least one heater/blower assembly comprises at least one of a gas-powered heater and an electric-powered heater.

14. The apparatus of claim 1 wherein the at least one heater/blower assembly comprises an electric-powered heater.

15. The apparatus of claim 1 additionally comprising a fail-safe door disposed at an end of the product conveyance path.

16. The apparatus of claim 1 additionally comprising means to maintain a constant pressure in a plenum.

17. The apparatus of claim 1 additionally comprising a plurality of bottom slats to control the placement of air under the package.

18. The apparatus of claim 1 wherein the airfoil elements are each configured to rotate at a plurality of angles relative to the respective side wall assembly inner wall to provide laminar air flow to product along the conveyance path and to vertically alter an impact point onto product.

* * * * *